United States Patent
Burgin et al.

(10) Patent No.: US 11,303,455 B2
(45) Date of Patent: Apr. 12, 2022

(54) AUTHENTICATING DEVICES OVER A PUBLIC COMMUNICATION NETWORK

(71) Applicant: BAE Systems Controls Inc., Endicott, NY (US)

(72) Inventors: William A. Burgin, Endicott, NY (US); Liam J. Garstang, Apalachin, NY (US)

(73) Assignee: BAE Systems Controls Inc., Endicott, NY (US)

( * ) Notice: Subject to any disclaimer, the term of this patent is extended or adjusted under 35 U.S.C. 154(b) by 0 days.

(21) Appl. No.: 17/282,887

(22) PCT Filed: Feb. 18, 2021

(86) PCT No.: PCT/US2021/018457
§ 371 (c)(1),
(2) Date: Apr. 5, 2021

(87) PCT Pub. No.: WO2021/168037
PCT Pub. Date: Aug. 26, 2021

(65) Prior Publication Data
US 2021/0385089 A1    Dec. 9, 2021

Related U.S. Application Data

(60) Provisional application No. 62/978,264, filed on Feb. 18, 2020.

(51) Int. Cl.
*H04L 9/32* (2006.01)
*H04L 9/06* (2006.01)
*H04L 9/08* (2006.01)

(52) U.S. Cl.
CPC .......... *H04L 9/3242* (2013.01); *H04L 9/0643* (2013.01); *H04L 9/0869* (2013.01); *H04L 2209/84* (2013.01)

(58) Field of Classification Search
CPC .... H04L 9/3242; H04L 9/0643; H04L 9/0869
See application file for complete search history.

(56) References Cited

U.S. PATENT DOCUMENTS

| 7,961,076 | B2 * | 6/2011 | Kelley | ................ B60R 25/257 340/5.72 |
| 2007/0200671 | A1 * | 8/2007 | Kelley | ................ B60R 25/257 340/5.72 |

(Continued)

FOREIGN PATENT DOCUMENTS

WO     2019069129 A1     4/2019

OTHER PUBLICATIONS

Emanuel Fonseca et al., A Survey of Existing Approaches for Secure Ad Hoc Routing and Their Applicability to Vanets, NEC Technical Report NLE-PR-2006-19. (Year: 2006).*

(Continued)

*Primary Examiner* — Shanto Abedin
(74) *Attorney, Agent, or Firm* — Scott J. Asmus; Gary McFaline; Scully Scott Murphy & Presser PC

(57) ABSTRACT

Apparatus and method for authentication components of a public network are disclosed. A master compares an actual HMAC with an expected HMAC, determines that component fails authentication when the actual HMAC does not match the expected HMAC and causes at least one operation to be inhibited when component fails authentication for a preset number of times while the component is connected to the public network. The actual HMAC is determined by the component. The expected HMAC and actual HMAC are independently determined using the same process and using a key. The same key is stored, in advance, in both the master and the component and not transmitted. The master generates a random number and sends the same to the component. The expected HMAC and actual HMAC are determined (Continued)

using the random number input into a one-way hash function.

22 Claims, 11 Drawing Sheets

(56) References Cited

U.S. PATENT DOCUMENTS

| | | | |
|---|---|---|---|
| 2016/0264071 A1* | 9/2016 | Ujiie | H04L 63/123 |
| 2017/0244566 A1* | 8/2017 | Tschache | H04L 9/3242 |
| 2018/0084412 A1* | 3/2018 | Alfred | H04L 9/088 |
| 2019/0069129 A1 | 2/2019 | Allen et al. | |
| 2019/0184916 A1* | 6/2019 | Troia | H04W 4/44 |
| 2019/0213145 A1 | 7/2019 | Stitt et al. | |
| 2019/0245690 A1* | 8/2019 | Shah | H04L 9/3242 |
| 2019/0306136 A1* | 10/2019 | David | H04L 9/0841 |
| 2020/0005570 A1* | 1/2020 | Troia | B60R 25/24 |
| 2020/0288427 A1* | 9/2020 | de la Broise | G06F 21/73 |
| 2020/0351260 A1* | 11/2020 | White | G06F 21/57 |
| 2021/0111874 A1* | 4/2021 | Tanji | H04L 63/0435 |

OTHER PUBLICATIONS

Ashritha M. et al, RSU Based Efficient Vehicle Authentication Mechanism for Vanets, IEEE (Year: 2015).*

Hiroshi Ueda et al, Security Authentication System for In-Vehicle Network, SEI Technical Review (Year: 2015).*

Huang et al., "Message Authentication Scheme for Vehicular Ad-Hoc Wireless Networks without RSU", Journal of Information Hiding and Multimedia Signal Processing, Jan. 2015, retrieved on [Apr. 18, 2021]. Retrieved from the internet<URL: http://bit.kuas.edu.tw/-jihmsp/2015/vol6/JIH-MSP-2015-01-008.pdf> entire document.

International Search Report, PCT/US2021/018457, dated May 5, 2021, 8 pages.

* cited by examiner

| Slave | Random No. | Timer | Counter |
|---|---|---|---|
| S0 | R0 | T0 | C0 |
| S1 | R1 | T1 | C1 |
| S2 | R2 | T2 | C2 |

AUTHENTICATING DEVICES OVER A PUBLIC COMMUNICATION NETWORK

CROSS REFERENCE TO RELATED APPLICATIONS

This application claims the benefit of U.S. Provisional Application No. 62/978,264 filed on Feb. 18, 2020, the contents of which are incorporated by reference.

FIELD OF THE DISCLOSURE

This disclosure relates generally to authenticating devices such as removable devices which use a communication bus.

BACKGROUND

A system may comprise multiple devices. These devices may be removable and replaced with after-market parts or replaced with inferior components. Additionally, the devices may be upgraded with newer components. Further, the devices may be tampered with. The devices may be connected to a public communication network. When non-authenticated devices are connected to the public communication network, the operation of the system may be compromised.

For example, a system may be part of a vehicle (an example of a system). The vehicle may employ microprocessors or a processor in each device, each having program(s) that allow the vehicle to operate. Each device may have a role or function within the vehicle or collectively have a function within the vehicle. In a vehicle, data may be exchanged between the devices via a vehicle communication network (communication bus). The data and messages sent over the communication bus are typically unprotected and vulnerable and can be intercepted and read. This also allows for corruption of the messages and data and a lack of security for the devices responsible for operating the vehicle.

SUMMARY

Accordingly, disclosed is an apparatus, method and a computer program product for authenticating devices and causing at least one operation of a system to be inhibited or restricted.

Accordingly, disclosed is an apparatus comprising a storage storing a key associated with an vehicle device and a processor. The processor is configured to generate a random number, send the random number to the vehicle device via a vehicle communication network and receive an actual hash message authentication code (HMAC) from the vehicle device via the vehicle communication network. The vehicle device determines the actual HMAC using a HMAC algorithm on an input and the key stored in a storage of the vehicle device. The input is determined by the vehicle device using a hash function on the random number.

The processor is further configured to determine an expected hash message authentication code (HMAC) for the vehicle device using the HMAC algorithm on an input and the key stored in the storage. The input is determined by the apparatus using the hash function on the random number. The determination may be after sending the random number or in response to receipt of the actual HMAC.

The processor is further configured to compare the actual HMAC with the expected HMAC, determine that the vehicle device fails authentication when the actual HMAC does not match the expected HMAC and cause at least one vehicle operation to be inhibited when the vehicle device fails authentication for a preset number of times while the vehicle device is connected to the vehicle communication network.

In an aspect of the disclosure, the vehicle device may be authenticated when the actual HMAC matches the expected HMAC. When the vehicle device is authentic, the processor may control the vehicle operation based on signals received from interfaces without inhibiting any operations.

In an aspect of the disclosure, the processor may set a timer when the random number is sent to the vehicle device. The timer may be set to a time where the apparatus must receive the actual HMAC from the vehicle device. In accordance with this aspect, the processor may determine that the vehicle device fails authentication when the actual HMAC is not received within the time set on the timer.

In an aspect of the disclosure, the vehicle device may be an energy storage system (ESS). The ESS may comprise energy cells, a processor and contactors. In accordance with this aspect of the disclosure, wherein when the ESS fails authentication for the preset number of times, the processor may transmit a command to the ESS (processor in the ESS) to maintain the contacts open to isolate the energy cells from a DC voltage bus.

In an aspect of the disclosure, the apparatus may authentication multiple devices. In accordance with this aspect, the storage may store a plurality of keys associated with a plurality of vehicle devices, respectively. The vehicle device may be a propulsion control system, a accessory power supply and/or an EV charger controller.

In an aspect of the disclosure, the processor may count the number of attempts for authentication or number of retries and compare with a preset number of times. When the counted number of times is less than a preset number of times, the processor may generate a new random number and send the same to the same vehicle device and attempt authentication again.

Also disclosed is a method for authenticating onboard processors over a vehicle communication network. The method comprises generating a random number from a master, sending the random number from the master unit to at least one vehicle device, receiving an actual hash message authentication code (HMAC) from the at least one vehicle device via the vehicle communication network, processing at the master an expected hash message authentication code (HMAC) for each of the at least one vehicle device using the HMAC algorithm on an input and a stored key associated with each of the at least one vehicle device, comparing the actual HMAC to the expected HMAC in the master for each of the at least one vehicle device, and authenticating the at least one vehicle device if the actual HMAC matches the expected HMAC, and failing authentication if the actual HMAC does not match the expected HMAC. The method further comprises controlling certain vehicle operations upon authentication based on input received from interfaces; and causing at least one vehicle operation to be inhibited upon failing authentication for a preset number of times while the vehicle device is connected to the vehicle communication network.

In an aspect of the disclosure, each vehicle device determines the actual HMAC using a HMAC algorithm on an input and a key stored in the respective vehicle device. T input is determined by each vehicle device using a hash function on the random number.

In an aspect of the disclosure, the master determines the input for each vehicle device, respectively, using the hash function on the respect random number. A different key is stored in association with each vehicle device.

In an aspect of the disclosure, the preset number of times may be 1. In other aspects, the preset number of times may be greater than 1.

In an aspect of the disclosure, the master may be a system control unit (SCU) of a hybrid electric vehicle or an electric vehicle.

In an aspect of the disclosure, the at least one vehicle operation is an operation associated with a vehicle device that failed authentication for the preset number of times. In an aspect of the disclosure, the vehicle operation(s) may comprise high voltage, high, current, high power, navigation, range and/or duration.

For example, when the vehicle device is an energy storage system (ESS), the ESS may be isolated from a DC voltage bus.

In an aspect of the disclosure, a different random number may be generated and used for different vehicle devices.

In an aspect of the disclosure, the hash function may be SHA3-256.

In an aspect of the disclosure, the actual HMAC may be truncated or padded to a 64 bit size.

In an aspect of the disclosure, the random number may be generated by a pseudorandom number generator (PRNG) or a cryptographically secure random number generator (CSRNG).

In an aspect of the disclosure, the method may further comprise setting at least one timer when the random number is sent to each vehicle device, respectively. The set time is a time where the master must receive the actual HMAC from a vehicle device. In an aspect of the disclosure, the time may be different for different vehicle devices.

In an aspect of the disclosure, the time may be 500 ms. In other aspects, the time may be 1 second.

In an aspect of the disclosure, the master may determine that an attempted authentication fails for a vehicle device when the time expires without receipt of the actual HMAC from the vehicle device.

In an aspect of the disclosure, the method may further comprise counting a number of times authentication has failed per vehicle device; and comparing the counted number of times with the preset number of times. In accordance with this aspect, the authentication process may be repeated with a new random number when the counted number of times is less than the preset number of times.

Also disclosed is a computer program product including one or more non-transitory machine-readable media having instructions encoded thereon that, when executed by a processor, cause the processor to authenticate onboard processors over a vehicle communication network.

BRIEF DESCRIPTION OF THE FIGURES

FIG. 10 is an example of a table in the volatile memory showing the association between a slave, random number, timer and counter in accordance with aspect of the disclosure;

These and other features of the present embodiments will be understood better by reading the following detailed description, taken together with the figures herein described. The accompanying drawings are not intended to be drawn to scale. For purposes of clarity, not every component may be labeled in every drawing.

DETAILED DESCRIPTION

Figure 1:
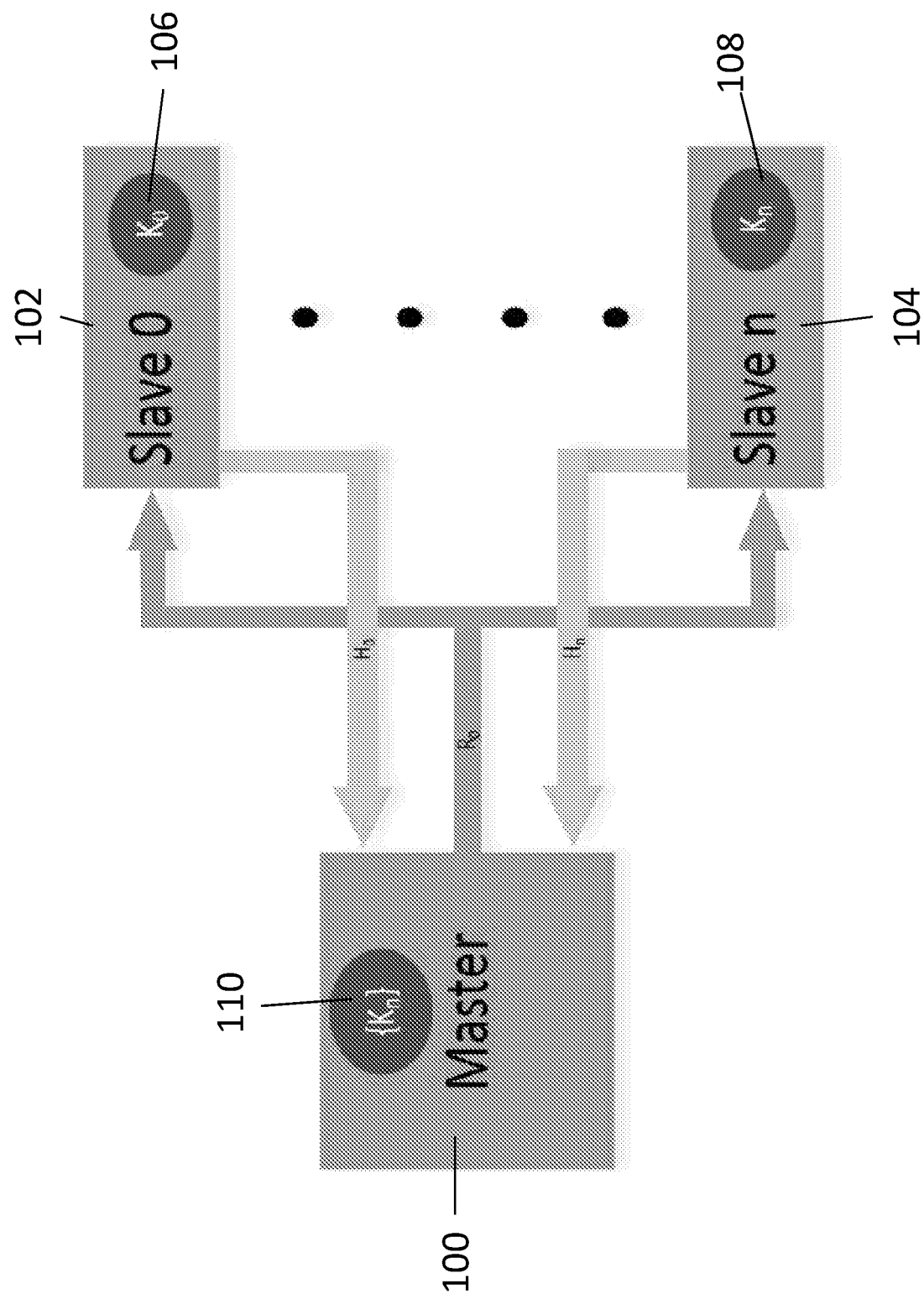
FIG. 1 is a diagrammatic overview of an authentication process in accordance with aspects of the disclosure.

Disclosed are techniques and architecture for transmitting data and messages across the public network that only is intelligible for authenticated devices. FIG. 1 is a diagrammatic overview of an authentication system in accordance with aspects of the disclosure. The authentication system may be used in any system where devices are connected to a public network. For example, the authentication system may be included in a vehicle. As used herein, vehicle(s) refers to any land based items such as cars, trucks, buses, tanks and the like. Vehicle(s) also includes airborne vehicles such as UAVs, planes and helicopters. Similarly, vehicle(s) also includes water based vehicles such as amphibious vehicles, ships, UUVs and submarines. The vehicle may be a combustion vehicle, a hybrid vehicle or an electric vehicle.

In an aspect of the disclosure, the authentication system has a master-slave configuration. The master 100 is responsible for authenticating the slaves 102, 104. In FIG. 1, the slaves are identified as Slave 0 though Slave n, e.g., a plurality of slaves with a master 100. N can be one or more. A slave may also be an additional master.

The master 100 has a copy of keys 110 issued to all of the slaves 102, 104. The set of keys is identified in FIG. 1 as $\{K_n\}$. Each individual slave has a unique key. The keys 110 may be programmed or loaded into the master 100 when the system is configured. For example, the keys 110 may be incorporated in firmware. The unique key in each slave 102, 104 may be programmed or loaded into the slave 102, 104 also when the system is configured. If there is a need to replace or change one of the slaves, in an aspect of the disclosure, a new key may loaded or programmed into both the master 100 and the slave that is new. In other aspects of the disclosure, a key may be unique to a type of slave as opposed to a specific slave such that when the same type of slave is replaced, a new key need not be assigned. For example, the same key may be used for a particle model of ESS 205. In an aspect of the disclosure, the keys may be loaded by an authorized user. In an aspect of the disclosure, the keys may also be periodically changed.

In FIG. 1, the key for slave 0 102 is identified as $K_0$ 106. In FIG. 1, the key for slave n 104 is identified as $K_n$ 108. In an aspect of the disclosure, the master 100 may also be responsible for controlling functions of the system (e.g., vehicle) and the respective slaves 102, 104 (in addition to authentication). In an aspect of the disclosure, the master 100 and slaves 102, 104 may be line replaceable units (LRUs).

The public network may support broadcast messaging where the master 100 sends one message (transmission) to all of the slaves 102, 104. Each slave 102, 104 sends message(s). The messages may be heard by other slaves as well as the master 100.

Figure 2:
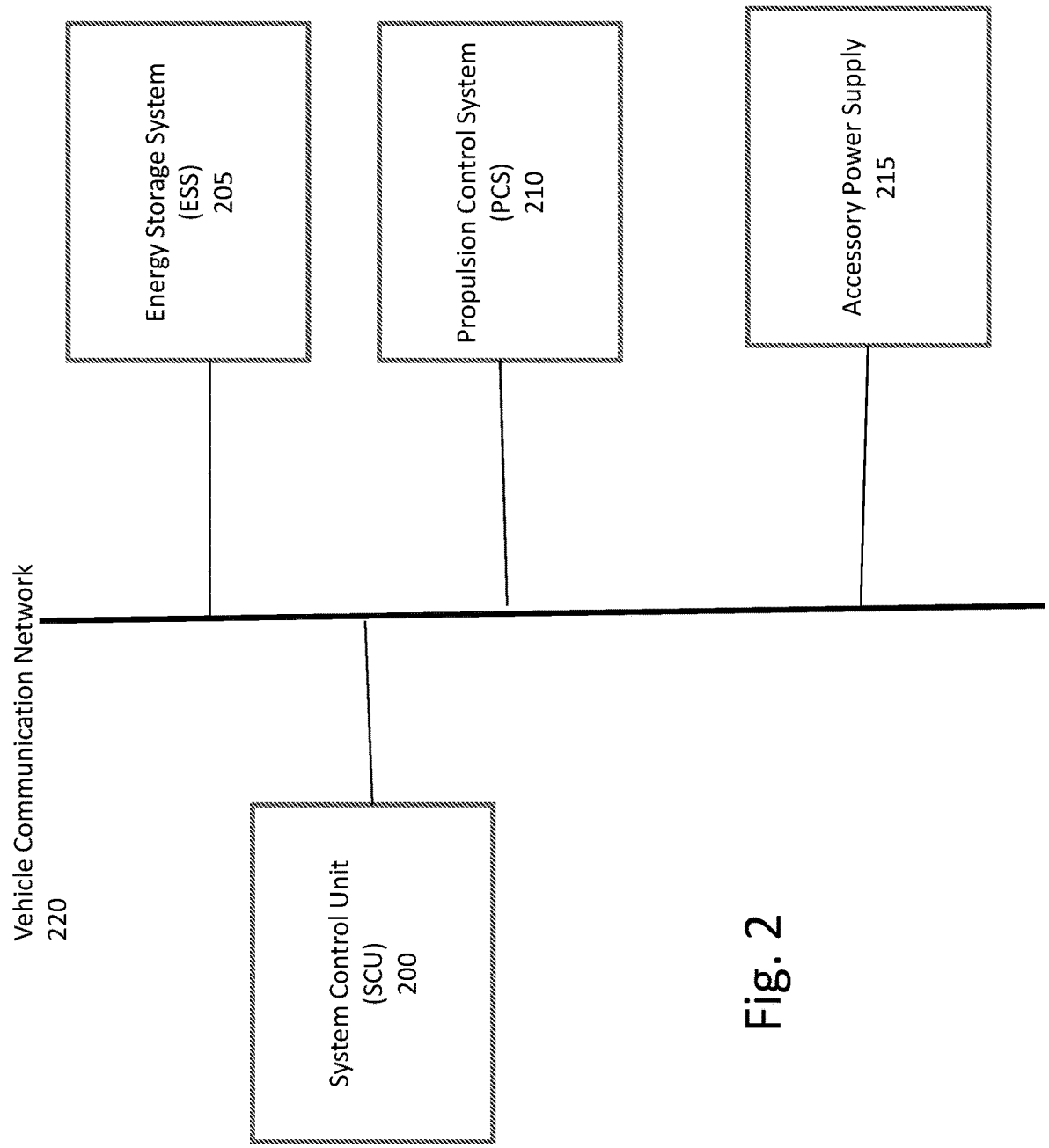
FIG. 2 is a diagram showing certain components of a vehicle in accordance with aspects of the disclosure.

FIG. 2 is a diagram showing certain components of a vehicle such as a hybrid or an electric vehicle in accordance with aspects of the disclosure. FIG. 2 shows a system control unit (SCU) 200 (example of master) and an energy storage system (ESS) 205, propulsion control system (PCS) 210 and accessory power supply (APS) 215 (examples of slaves) and a vehicle communication network 220 (example of a public network). The vehicle communication network 220 may be implemented as a control area network (CAN). CAN is a common communication protocol used across various industries. However, CAN is both non-encrypted and public. Therefore, data and messages sent over this network are unprotected and vulnerable. For instance, a bad actor could use a CAN capable scan tool and plug it into a port on the side of the system (e.g., vehicle), thereby accessing all data transmitted across the network. The data could be used, manipulated or used for unintended purposes such as inserting improper message traffic or replacing devices with inferior performance.

Figure 9:
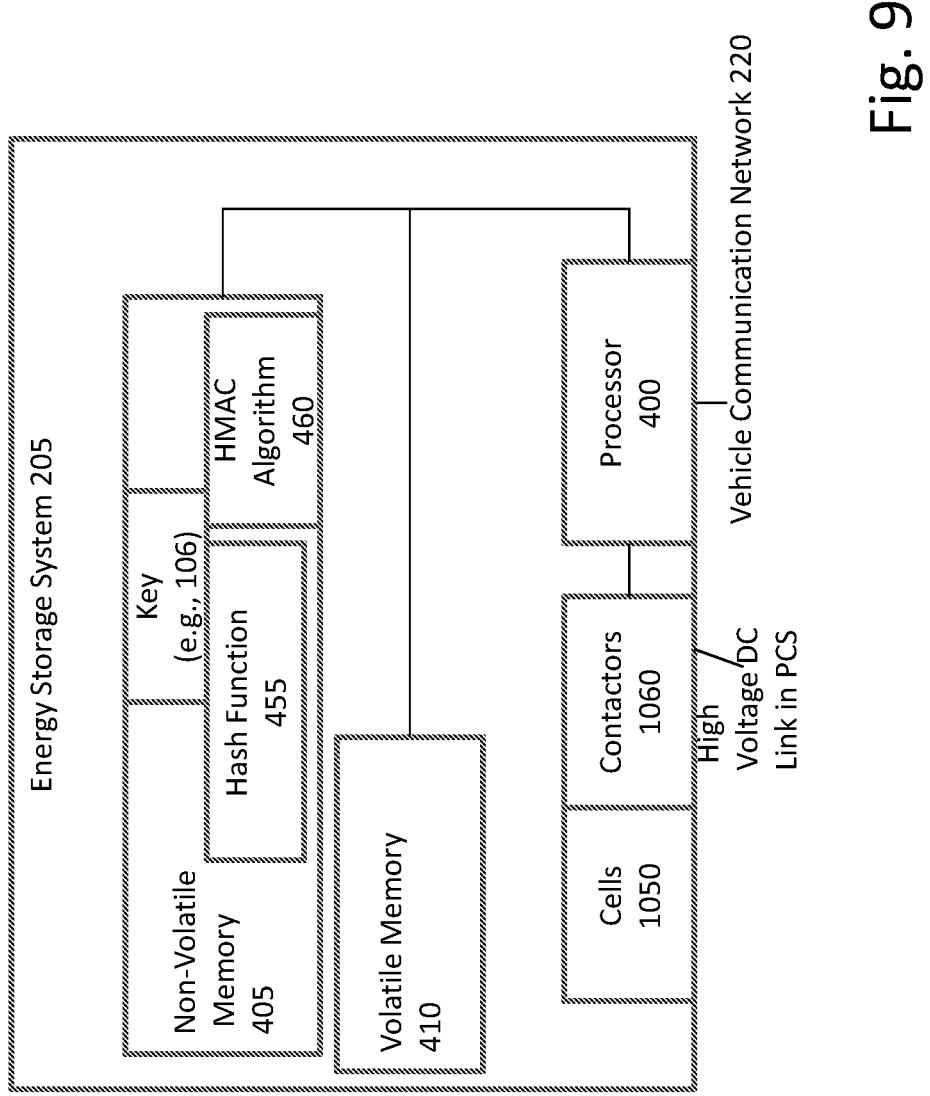
FIG. 9 is a diagram of an energy storage system in accordance with aspects of the disclosure.

The ESS 205 provides a direct current (DC) electrical power to a DC link. The DC link may be a high voltage DC link. High voltage used herein means a voltage above 50V. A block diagram of the ESS 205 is shown in FIG. 9. The ESS 205 may include lithium ion batteries (cells 1050). In an aspect of the disclosure, the nominal voltage of DC link is above 600V. The DC link is a high voltage. The ESS 205 may provide power to a transmission to move the vehicle. The ESS 205 may also be recharged (regenerative energy recovered from the drivetrain).

Figure 4:
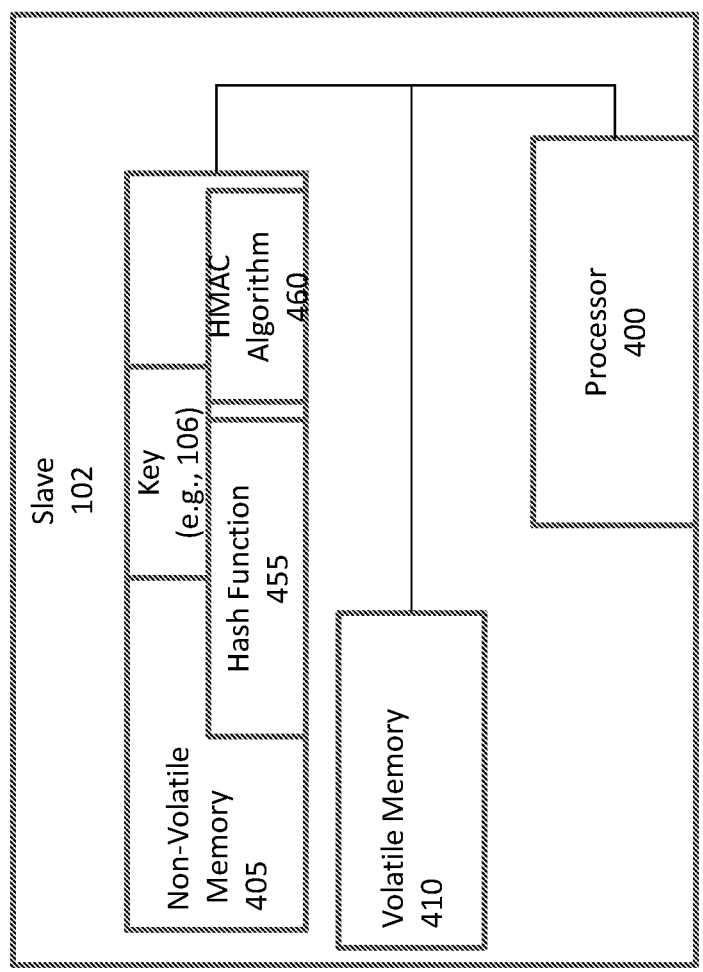
FIG. 4 is a diagram of a slave in accordance with aspects of the disclosure.

The ESS 205 may also alternatively include ultra-capacitors, lead-acid batteries, and other energy storage mediums. The ultra-capacitor may include an electric double-layer capacitor (EDLC), also known as a, supercapacitor, supercondenser, or an electrochemical double layer capacitor, which has an electrochemical capacitor with relatively high energy density. The ESS 205 may also have contactors 1060. The contactors 1060 is/are positioned to isolate or electrically couple the ESS 205 from/to the DC link. In other aspects, the contactors 1060 may be external to the ESS 205. In other aspects, the contactors 1060 may in incorporated into the PCS 210. The contactors 1060 enable the voltage of the DC link to be independent of the voltage of the ESS 205. The contactors 1060 may be controlled based on a command received from the SCU 200. The ESS 205 may also include additional components which are described for slaves including processor 400, non-volatile memory 405 and volatile memory 410 as shown in FIG. 4 (and FIG. 9).

The PCS 210 functions to regulate power to a motor to move the vehicle. For example, the PCS 210 may comprise an inverter (for an electric vehicle). The inverter may be coupled to the DC link and the motor. In other aspects, the PCS 210 may comprise two inverters. One inverter coupled to a genset (generator and engine) and other coupled to the motor. Both inverters may be coupled to the DC link.

The SCU 200 may control one or more functions of the vehicle based on input received from user interfaces (such as a pedal or brake), input received from sensors, input from the ESS 205, such as state of charge (SOC) and PCS 210. For example, the SCU 200 may receive input from the user interfaces and issue a torque or speed command to the PCS 210, which in turns regulates power from the DC link into a motor. In other aspects, in a hybrid vehicle, the SCU 200 may also determine torque sharing between a genset and the ESS 205. The hybrid vehicle may be a series or parallel hybrid.

The APS 215 may comprise one or more modules for supplying power for the accessories. The modules may be DC to DC converters or DC to AC converters. The slaves are not limited to the example of devices depicted in FIG. 2. For example, other slaves may be, but not limited to, an engine controller, steering controller, display, information systems, air conditioning controllers, electric brake controller, EV charge controller, high voltage PDUs, air compressors, . . . etc.

Figure 3:
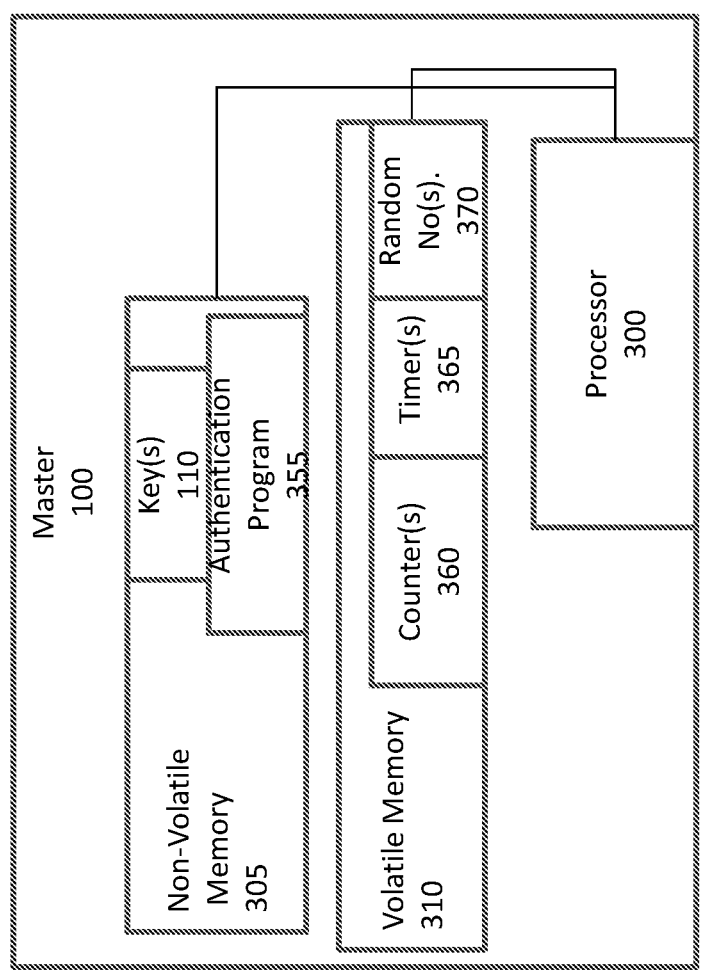
FIG. 3 is a diagram of a master in accordance with aspects of the disclosure.

FIG. 3 illustrates a block diagram of a master 100 in accordance with aspects of the disclosure. The master 100 comprises a processor 300, non-volatile memory 305 and volatile memory 310. The processor 300 may be microcontrollers, microprocessors or field programmable gate arrays (FPGAs). The non-volatile memory 305 may be read-only memory (ROM) and flash memory. The non-volatile memory 305 may include one or more programs or modules to execute the functionality description herein. For example, the programs or modules may include an authentication program 355. In an aspect of the disclosure, the authentication program 355 may include a hash function and a HMAC algorithm. In an aspect of the disclosure, the authentication program 355 may include an algorithm (or module) for random number generation. Additionally, the authentication program 355 may have a module for fault mode, such as causing one or more operations of the system (e.g., vehicle) to be inhibited or restricted. The non-volatile memory 305 may also have the keys 110. The non-volatile memory 305 may have programs or modules for controlling the slaves after authentication. The programs are not shown for simplifying the figures.

The volatile memory 310 may be RAM or other temporary storage. The volatile memory 310 may be working memory for the authentication program 355, information needed to control the slaves 102, 104, information received from sensors and the slaves 102, 104. In an aspect of the disclosure, the volatile memory 310 may include counter(s) 360, timer(s) 365 and random number 370 used by processor 300 in executing the authentication program 355. The counter(s) 360, timer(s) 365 and random numbers 370 may be associated with respective slaves 102, 104. For example, the volatile memory 310 may include a database of slave associated with the counter 360, timer 365 and random number 370 as shown in FIG. 10. The counter 360 may be used to count failed authentications in a given period or retries. The timer 365 may be used as a time-bound limitation for a reply to a message from the master 100, e.g., set when a random number is set (as will be described later). For example, in FIG. 10, slave S0 is associated with a random number R0, the timer is T0 and the counter (total attempts or retries) is C0.

FIG. 4 illustrates a block diagram of a slave (e.g., slave 0 102) in accordance with aspects of the disclosure. A slave comprises a processor 400, non-volatile memory 405 and volatile memory 410. The processor 400 may be microcontrollers, microprocessors or field programmable gate arrays (FPGAs). The non-volatile memory 405 may be read-only memory (ROM) and flash memory. The non-volatile memory 405 may include one or more programs or modules to execute the functionality description herein. For example, the programs or modules may include the same hash function 455 and HMAC algorithm 460 as the master 100. The non-volatile memory 405 may also include the unique key (e.g., key 106) for the slave (e.g., 102). The non-volatile memory 405 may also include programs or modules for executing function(s) associated with the slave. The function(s) may depend on the type of device the slave is.

The volatile memory 410 may be ROM or other temporary memory. The volatile memory may be working memory for the slave and store the results of the hash function 455 and the HMAC 460. The volatile memory 410 may also store information used in executing function(s) associated with the slave. The slave may also have additional components (not shown in FIG. 4) specific to the type of slave such as the power electronics described above and other circuitry.

Figure 6:
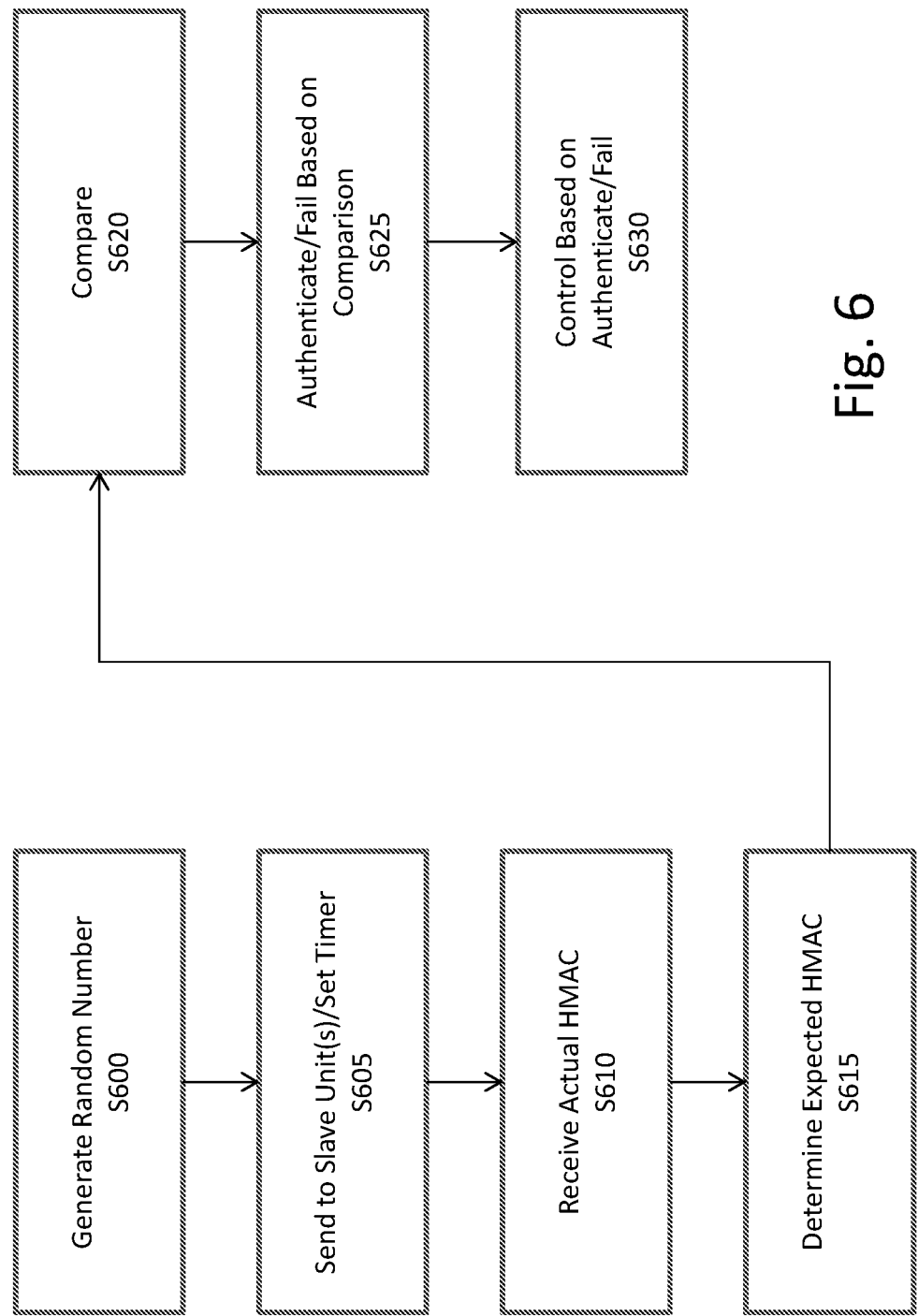
FIG. 6 and FIG. 7 are flow charts depicting a method of authentication in accordance with aspects of the disclosure.
Figure 7:
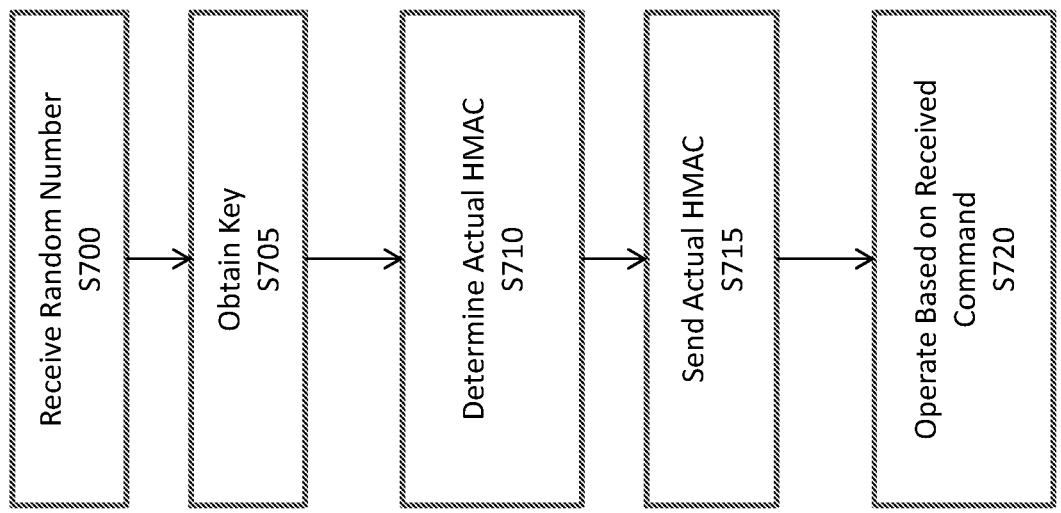

FIGS. 6 and 7 illustrate flow charts for the authentication of a slave in accordance with aspects of the disclosure. FIG. 6 shows functions of the master 100 and FIG. 7 shows functions of the slave(s) 102, 104.

The authentication process may automatically begin when a preset event occurs. In an aspect of the disclosure, the preset event may be when the system (e.g. vehicle) is powered on. For example, in a vehicle, the preset event may be when the key for an ignition is turned (power-up state). In such an event, the SCU 200 may receive a key-on signal (a master run signal). In other aspects, the preset event may be when an ESS 205 is recharged by an external device. In other aspects, the preset event may be idle for a preset time. In other aspects, the preset event may be periodic.

Figures 11A, 11B:
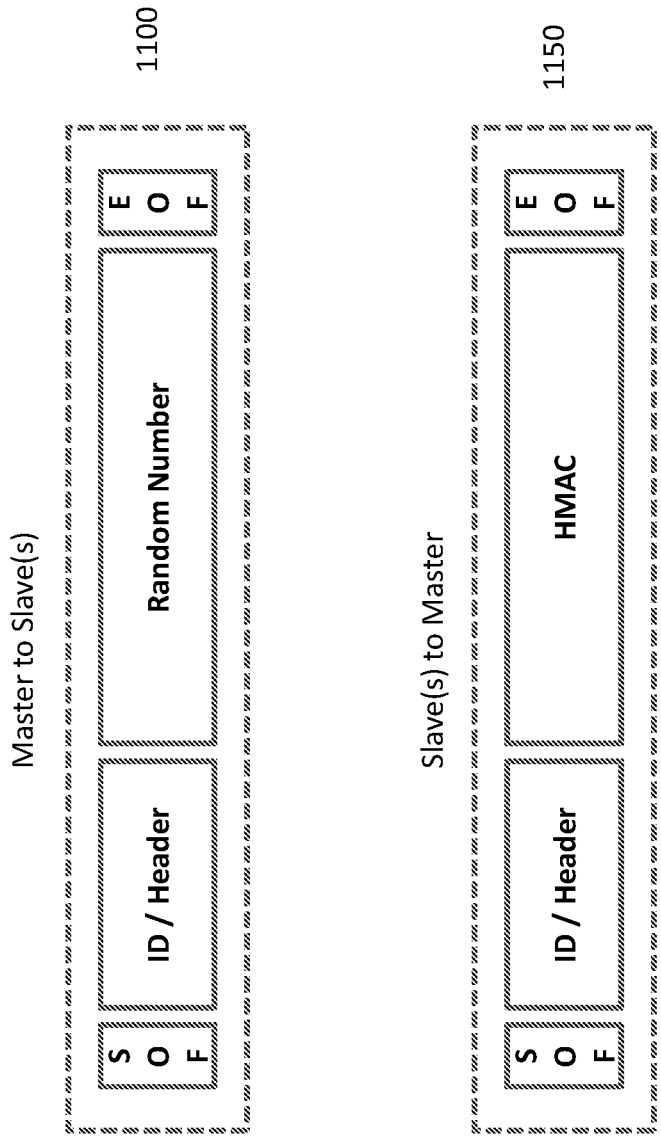
FIG. 11A is a diagram showing an example of a message frame from a master to a slave(s)
FIG. 11B is a diagram showing an example of a message frame from a slave(s) to a master.

When the preset event is system power-on, the master 100 and slaves 102, 104 begin to communicate with each other over the CAN (e.g., vehicle communication network 220). In this manner, the master 100 is aware of all slaves connected with the public network. When a master 100 receives a message from a slave, the master 100 broadcast a request for authentication to the slave (e.g., 102). The request may include a predefined identifier in the CAN message. The predefined identifier may be used to discriminate a request for authentication from other CAN messages. A CAN message in typically sent as a frame. The frame includes an ID/header and data field. In an aspect of the disclosure, the predefined identifier may be included in the ID/header. The data field may be 0-64 bits in length. In another aspect of the disclosure, the data field may contain this predefined identifier. FIG. 11A illustrates an example of a frame 1100 from the master 100 to a slave (e.g., 102). The frame 1100 may also be a remote transmission request, e.g., requesting transmission of the random number. The frame 1100 may also include both a start of frame (SOF) and an end of frame (EOF) to indicate the start and end of the message. The identifier of the source of the frame may be included in the ID/header and ID/header may also include the destination identifier, e.g., the identifier of the slave, when the random number is different for each slave. In other aspects, the destination identifier may be omitted when the random number is the same for the slaves. The ID/header may be 29 bits.

The request for authentication may include a random number associated with the slave.

The master 100 generates a random number for the slave at S600. The master 100 will generate a different random number for each slave 102, 104. In an aspect of the disclosure, this random number is generated from a pseudorandom number generator (PRNG). In another aspect, the random number is generated from a cryptographically secure random number generator (CSRNG). The use of a PRNG or a CSRNG ensures a certain level of entropy or randomness. The processor 300 generates the random number using one of the above techniques.

In another aspect of the disclosure, the same random number may be used for all the slaves in a given authentication session (cycle) such that the random number is valid for a period of time.

In another aspect of the disclosure, the slave 102, 104 may initially transmit a request for authentication. The request for authentication may include the predefined identifier in the CAN message. The predefined identifier may be used to discriminate a request for authentication from other CAN messages. In response to the request, the master 100 broadcasts the frame 1100 to the slave that requested authentication.

At S605, the master 100 sends the random number to any slave that communicated with the master 100. In other aspects, the master 100 sends the random number to each slave 102, 104 that requested authentication. In an aspect of the disclosure, the master 100 generates a unique frame for each slave 102, 104. This is to allow for only the target slave to respond to the frame. In other aspects, the same frame 1100 may be used for all slaves, where the random number is the same for all slaves. The random number may be included in the data field. In some aspects, the random number may be 64 bits in length or less. In some aspects, the random number may be padded to obtain a number of 64 bits in length. The generated random number is stored in the volatile memory 310 (in 370). Each frame may be broadcast onto the vehicle communication network 220 (CAN bus). The frame may also include a bit to identify a remote transmission request (RTR).

In an aspect of the disclosure, where the same random number is generated for all of the slaves 102, 104, one frame may be sent instead of multiple frames. The random number is shown in FIG. 1 as $R_g$. When the master 100 sends a frame having the random number to a slave, the processor 300 sets a timer to a preset, as a time-bound limitation. The value of the timer is stored in the volatile memory 310 (timer 365) in association with the random number 370 and an identifier of the respective slave.

The time-bound limitation provides an additional level of safety and security and can also deter bad actors from attempting to infiltrate and tamper with a system in accordance with aspects of the disclosure. The time-bound limitation may be a variable value. For example, the time-bound limitation may be longer when there are more slaves to allow for time for sequential authentication. For example, in a vehicle where there are multiple ESS connected, authentication may take longer and thus, the time-bound limitation may be set to a higher value to avoid false time-outs.

In other aspects, the authentication may be in parallel. In an aspect of the disclosure, the time-bound limitation is 500 milliseconds (ms). In other aspects, the time-bound limitation may be higher such as 1 second. Further, in an aspect of the disclosure, a different time-bound limitation may be used for different types of slaves. For example, when the slave is a high voltage, and/or high power and/or high current device, the time may be shorter than when the slave is of lower voltage, and/or lower power and/or lower current.

Once set, the timers 365 may count down. In other aspects, the timers 365 may start at zero and count up to the set time. The processor 300 may continuously monitor each of the set timers for expiration (e.g., reaching the time-bound limitation). When a response is received with a frame containing an actual HMAC, the respective timer is stopped, otherwise, the timer(s) continue.

At S700, the slave (e.g., 102) receives a frame containing the random number. In response to receipt of the random number, the processor 400 in the slave extracts the random number from the frame and retrieves a key (e.g., 106) stored in the non-volatile memory 405 at S705.

Figure 5:
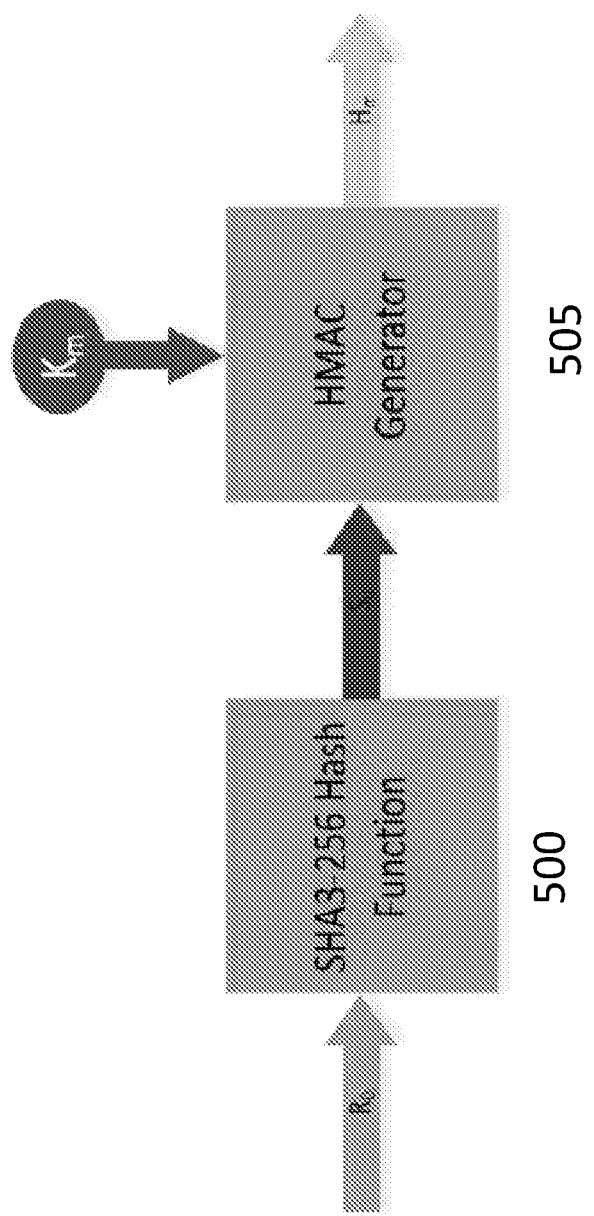
FIG. 5 is a diagrammatic overview showing how a Hash message authentication code is generated, in accordance with aspects of the disclosure.

At S710, the processor 400 in the slave determines the HMAC for the slave. FIG. 5 is a diagrammatic overview showing how the HMAC is generated, in accordance with aspects of the present disclosure. The respective slave 102, 104 takes the respective random number ($R_0$) from the master 100 and runs it through a secure one-way hash function 455. In an aspect of the disclosure, the secure hash function may be a National Institute of Standards and Technology (NIST) approved hash function such as SHA1, SHA2, SHA3 and SHAKE. For example, the SHA3 may be a SHA3-256 hash function. The SHA3-256 hash function has a low memory overhead and good runtime speed. The secure hash function allows for updates published by the NIST as a U.S. Federal Information Processing Standard (FIPS) and ensures that the output that is produced is secure, thereby providing safe transmission over a public, non-encrypted network such as the CAN. The secure hash function 455 produces an output ($S_0$), e.g., computes SHA3 (R) and receives S out, where R is the random number. The respective slave 102, 104 will use its unique key ($K_m$) with $S_0$ in the HMAC Generator (HMAC algorithm 460) to produce an HMAC ($H_m$), e.g., computes HMAC(S, K) and receives an HMAC as output, where K is the key and S is the output of the secure hash function (input to the HMAC).

In an aspect of the disclosure, the HMAC algorithm 460 may use FIPS standard such as FIPS 198-1 keyed HMAC algorithm. For example, in an aspect of the disclosure, the processor 400 compares the length of key (e.g., 106) with a set length, e.g., B-bytes. If the length is less than B-bytes, than, the processor 400 appends set values to the end of the key (e.g., 106) to create a k' having the set length. For example, the set length may be 64 bytes. If the length of the key (e.g., 106) is greater than the set length, e.g., B-bytes, the processor 400 executes a hash of the key (e.g., 106) to obtain a string of length L. The string of length L may be padded if necessary to create the key k' having the set length.

Afterwards, the processor 400 may perform a set logical operation on the key k' (or key, e.g., 106, if the key is the set length) (collectively referenced as K') and another value. The logical operation may be an XOR function. This other value may be ipad. Ipad is an inner padding where a certain pattern is repeated and may be set to a predefined value. The processor 400 uses the result of the logical operation and appends the result of the secure hash function S to the same. The processor 400 executes a hash function on the result of the logical operation and the appended result of the secure hash function S, e.g., H (K' XOR ipad) concatenation S.

The processor 400 also may perform a set logical operation on K' and another value. The logical operation may be an XOR function. The other value may be opad. Opad is an outer padding where a certain pattern is repeated and may be set to a predefined value. The result of the logical operation is appended to the hash function results and the processor 400 executes a hash of the final result, e.g., H ((K' XOR opad) concatenation H (K' XOR ipad) concatenation S) which becomes the HMAC.

Depending on the size of the HMAC, the HMAC may be padded or truncated to a set length. For example, the set length may be 64 bits, e.g., the length of the data field. In an aspect of the disclosure, when truncation is used, the leftmost bits of the determined HMAC may be used in the data field. In other aspects, the HMAC may be truncated to a length less than the set length and then padded to the set length (referenced herein as the actual HMAC).

Although the keys used to compute the HMACs are never sent over the vehicle communication network 220 (CAN bus), the HMACs are safe to send over a CAN bus. This is because of the robustness of the secure hash function 455 and HMAC algorithm 460. Even if a bad actor had the resulting HMAC and the random number, they would be unable to reverse engineer and determine the unique key. The is because the hash function 455 and HMAC algorithm 460 used herein are designed so that whatever the output is, it is computationally infeasible to work backwards and try and ascertain the original input.

At 715, each slave 102, 104 sends a frame 1150 to the master 100 using the vehicle communication network 220 with the actual HMAC in the data field of the frame. The actual HMAC is shown in FIG. 1 as $H_0$ to $H_n$. The frame 1150 may also include the identifier of the respective slave such that the master 100 knows which slave sent the frame and the identifier of the master 100 (in the ID/header).

At S610, the master 100 receives the actual HMAC from the slave. In response to receipt thereof, the master 100 stops or resets the timer 365 associated with the slave 102, 104. Additionally, in response to receipt of the actual HMAC from the slave 102, 104, the processor 300 in the master 100 determines the expected HMAC (or truncated and/or padded HMAC). The processor 300 uses the same hash function 455 and HMAC algorithm 460 that the slave uses. The processor 300 also truncates and/or padded calculated HMAC to obtain the expected HMAC, as necessary. In an aspect of the disclosure, the processor 300 waits until the actual HMAC from the slave is received prior to starting the determination to save processing resources.

In other aspects of the disclosure, after the master 100 sends the random number to a slave, e.g., 102, the processor 300 determines the expected HMAC prior to receipt of the actual HMAC to save time.

At S620, the processor 300 in the master 100 compares the actual HMAC received from a slave with the expected HMAC determined by the master (for each slave). At S625, the processor 300 in the master determines whether the slave is authentic based on the comparison (or a failure to authenticate).

If the received HMAC (from a slave) equals the expected HMAC (for the same slave), then that slave (e.g., 102) is authentic. Once the authentication process has successfully completed (e.g., a match), then the master 100 may control a system such as a vehicle based on a normal operation mode, e.g., cause certain operations to be enabled (at S630). At S630, the master 100 may issue commands, as needed, to the slave to control at least one function of the system. The command and the function may depend on the functionality of the slave and the overall system.

At S720, the slave receives the command and executes the corresponding function or functions.

If the actual HMAC received from a slave (e.g., 102) does not match the expected HMAC (determined by the master), the slave is not authenticated.

In some aspects of the disclosure, a slave is allowed to attempt to authenticate a predetermined number of times within a period in case a slave is not authenticated the first attempt. In an aspect of the disclosure, the number of times may be 5. The number of times may be variable and may depend on the type of slave. For example, when the slave is a high voltage, and/or high power and/or high current device, the number of times may be less than when the slave is of lower voltage, and/or lower power and/or lower current. The number of times allowed may be stored in volatile memory 310 (and the processor 300 maintains a count of the attempts). The counts may be counted by counters which may be stored in volatile memory (counter(s) 360).

In other aspects, instead of using a total number of attempts, a number of retries may be used. The total number of attempts includes the first attempt and thus is one more than the number of retries.

In an aspect of the disclosure, if the master 100 does not receive an actual HMAC from a slave within the time (timer expires), the master 100 declares an authentication failure (failed attempt). This may count as one of the allowed failed attempts for that slave.

Figure 8:
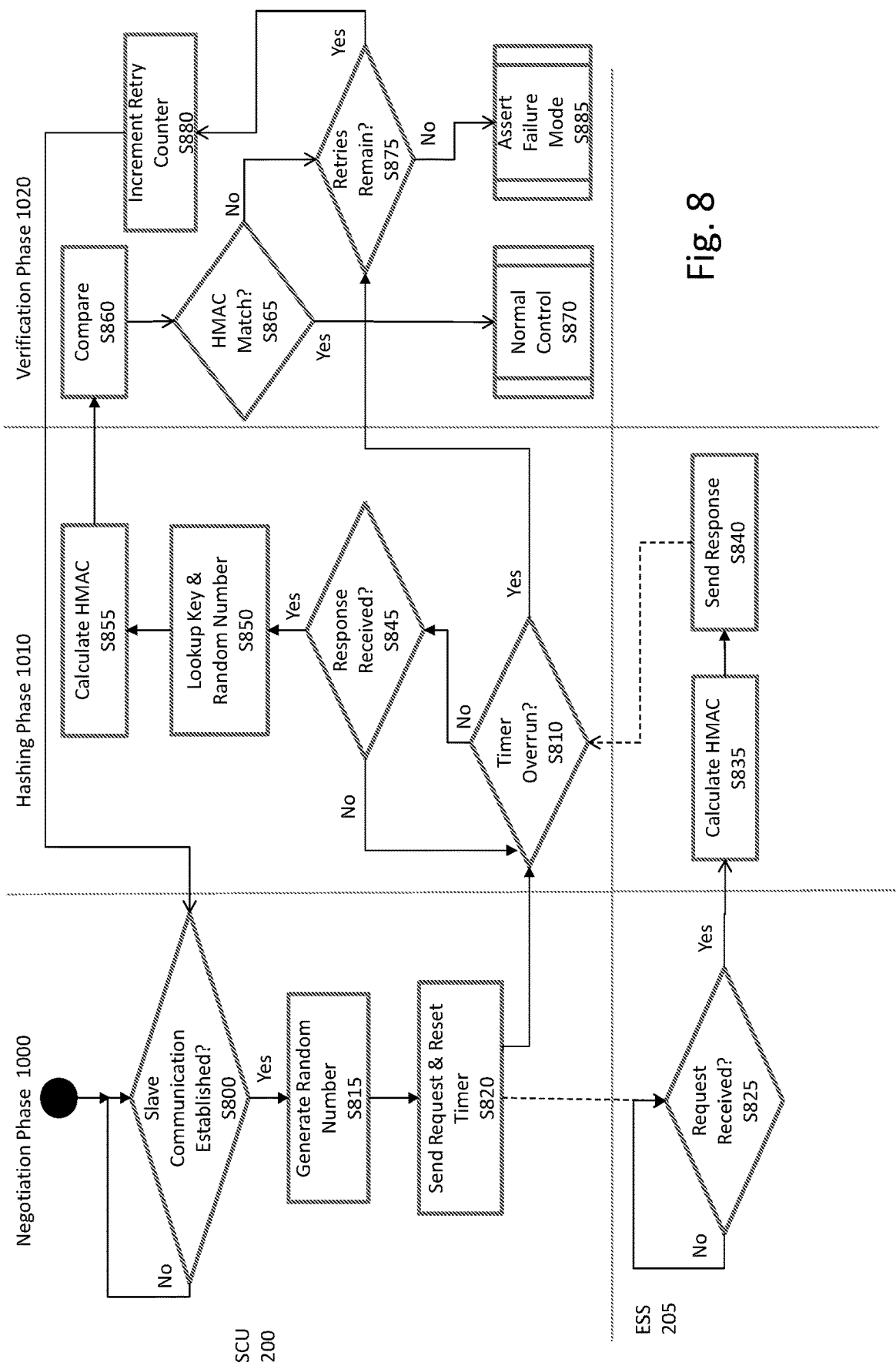
FIG. 8 is a flow chart depicting an example of authentication of an energy storage system in accordance with aspects of the disclosure.

FIG. 8 illustrates an example of the authentication process for an ESS 205 (example of a slave) by an SCU 200 (example of a master) in accordance with aspects of the disclosure. In this example the system may be either a hybrid electric vehicle or an electric vehicle such as a bus with a PCS 210 that is the power processing and power management center of the vehicle.

The process in FIG. 8 is shown in three phases: the negotiation phase 1000, the hashing phase 1010 and the verification phase 1020 for descriptive purposes; however, the process may not have distinct phases.

The processing starts in the SCU 200 and in one example, as described above; this is done as the vehicle is powered on. During the negotiation phase 1000, the processing commences with communication being established at S800. If communication between the SCU 200 and the ESS 205 is established, the SCU 200 generates the random number at S815 for the ESS 205. The SCU 200 uses a random number generator (included in the authentication program 355) such as the pseudorandom number generator (PRNG) or cryptographically secure random number generator (CSRNG) to generate the ESS random number. In other aspects of the disclosure, as described above, the ESS 205 may send a request for authentication. The SCU 200 may determine whether the authentication is requested. The request may include the predefined identifier. In response to the request, the SCU 200 may generate the random number for the ESS 205. At S820, the SCU 200 sends the random number to the ESS 205 via the vehicle communication network 220 (CAN bus).

The random number is included in the data field of the frame 1100. The predefined identifier may also be included in the ID/header such that the ESS 205 may distinguish the request for authentication from other CAN messages. Also at S820, the SCU 200 set a timer 365 to a time, e.g., time-bound limitation, for the ESS 205. In an aspect of the disclosure, this time-bound limitation may be specific for the ESS 205 (different from other time-bound limitations from other slaves). A running timer may be stored in the volatile memory 310.

At S825, the ESS 205 determines whether a frame 1100 with the random number has been received via the vehicle communication network 220 (CAN bus). If the frame 1100 with the random number is not received ("NO" at S825), the ESS 205 waits and repeats the determination (S825). When the ESS 205 determines that the frame 1100 with the random number has been received, the processing proceeds to the hash phase 1010 (at S830). At S830, the ESS 205 may retrieve the key (e.g., 106) from the non-volatile memory 305. At S835, the ESS 205 calculates the HMAC for the ESS 205. First, the ESS 205 uses a secure hash function 455 to generate an input to an HMAC algorithm 460. An example of the secure hash function 455 was described above. The secure hash function 455 is executed on the received random number. Then, the ESS 205 executes that HMAC algorithm 460 using the output of the secure hash function 455 and the retrieved key as input. An example, of the HMAC algorithm was described above. In an aspect of the disclosure, the ESS 205 may execute the secure hash function 455 on the received random number prior to retrieving the key for use in the HMAC algorithm 460 as the key is not needed in the secure hash function 455.

At S840, the ESS 205 sends a frame 1150 having the HMAC (actual HMAC) in the data field to the SCU 200 via the vehicle communication network 200 (CAN bus). At S845, the SCU 200 determines whether the frame 1150 having an actual HMAC has been received. For example, the SCU 200 may determine whether it received a frame having an HMAC in the data field from the ESS 205. When the SCU 200 determines that the actual HMAC is received ("YES" at S845), the retrieves the key and the random number 370 associated with the ESS 205 from the non-volatile memory 305. For example, the SCU 200 matches an identifier associated with the ESS 205 from the received frame with an identifier in the non-volatile memory 405 (which is associated with a key and a random number). At S855, the SCU 200 independently calculates an expected HMAC for the ESS. The SCU 200 uses the same secure hash function 455 to generate an input to the same HMAC algorithm 460. An example of the secure hash function 455 was described above. The secure hash function 455 is executed on the random number generated by the SCU 200 for the ESS 205. Then, the SCU 200 executes that HMAC algorithm 460 using the output of the secure hash function 455 and the retrieved key as input. An example, of the HMAC algorithm was described above. In an aspect of the disclosure, the SCU 200 may execute the secure hash function 455 on the random number prior to retrieving the key for use in the HMAC algorithm 460 as the key is not needed in the secure hash function 455 (e.g., only retrieves the random number 370 from the volatile memory 310).

As noted above, instead of waiting to receive the actual HMAC, the SCU 200 may calculate the expected HMAC while waiting for the actual HMAC from the ESS 205. In this aspect, after calculating the expected HMAC at S855, the SCU 200 proceeds to S845.

If the SCU 200 at S845 determines that the actual HMAC from the ESS 205 has not been received ("NO" at S845), the SCU 200 determines whether the time for receipt has expired, e.g., time-bound limitation, at S810. S810 is shown separate from S845 however, these steps may be executed together. At S810, the SCU 200 may monitor the value remaining on the timer 365 for the ESS 205 in the volatile memory 310. If there is remaining time, e.g., timer 365 has not expired or reached the time-bound limitation for the ESS, the SCU 200 continues to wait for the actual HMAC (returns to S845), otherwise, the process moves to the verification phase 1020 and to S875.

Once the actual HMAC is received and the expected HMAC calculated, the process proceeds to the verification phase 1020.

In the verification phase 1020, the SCU 200, compares the expected HMAC determined by the SCU 200 with the actual HMAC received from the ESS 205 at S860, to determine whether they are the same. If there is a match ("YES" at S865), the ESS 205 is authenticated and the SCU 200 is able to control the ESS at S870. In an aspect of the disclosure, normal control may include the SCU 200 issuing a command to the ESS 205 to close the contactors 1060 such that the ESS 205 is electrically connected with the DC link.

When the expected HMAC determined by the SCU 200 does not match with the actual HMAC received from the ESS 205 ("NO" at S865) or when the actual HMAC is not received within the time-bound limitation (Timeout), the attempted authentication is unsuccessful and the SCU 200 may determine whether there are more attempts allowed at S875. The SCU 200 may retrieve a counter 360 associated with the ESS 205 to determine if more attempts are allowed. The counter 360 may start at zero and count up to a maximum total attempts or retries or start at a maximum number of total attempts or retries and count down to zero. When there are more attempts or retries allowed ("YES" at S875), the SCU 200 increments (or decrements) the counter 360 by 1 at S880. The new value is stored in the volatile memory 310 and the process returns to S805. In an aspect of the disclosure, a new random number may be generated. In other aspects, the same random number may be used.

When there are no more attempts or retries allows ("NO" at S875), the SCU 200 asserts a failure mode at S885.

In other aspects, the failure mode (S885) may be asserted after only one failed attempt. In this case, S875 and S880 may be omitted. In this aspect, there are no retries.

In an aspect of the disclosure, the SCU 200 may issue a command to the ESS 200 to maintain the contactors 1060 in an open position isolating the ESS 205 from the DC link. This is to prevent an unauthorized ESS 205 that may be improper and/or inferior from the original equipment manufacturer (OEM) ESS 205, from powering the vehicle, which can have severe consequences. For example, the ESS 205 may have a different rating. Where the vehicle is a hybrid vehicle and can run only using the combustion engine, the vehicle may run only on the combustion engine. In an aspect of the disclosure, when a failure mode is detected, the SCU 200 may issue a notification to an operator via one of the interfaces such as a display. In an aspect of the disclosure, the vehicle may also have another network interface to an external network. In this embodiment, the SCU 200 may also issue a notification to an external device that the authentication failed.

In other aspects, instead of issuing a command to the ESS 205 to maintain the contactors 1060 open, the SCU 200 may issue a speed or torque command to the PCS 210 such that power to the motor is reduced (speed governor) or if the vehicle is a hybrid electric vehicle, the SCU 200 may issue a speed or torque command that requires a higher percentage of the torque sharing to come from the combustion engine (gen set). In other aspects, the SCU 200 may cause the vehicle to be controlled in such a manner with a mileage (Kilometer) limit (distance) and/or time limit for operation allowing time for the operator to drive the vehicle to a safe region or customer service center for maintenance or analysis. Where there is a set distance limit and/or a time limit, the SCU 200 may issue a notification to an interface such as a display or a speaker indicating the failure mode such that the time and/or distance may be displayed or heard. The distance and/or time being continuously updated such that the operator is aware of the remaining distance/time.

The functions or operations of the vehicle which are limited, restricted or inhibited may depend of the functions or operations of the slave which is not authenticated. For example, high power operations (current or voltage), such as in the PCS 210, the downstream components, such as a motor made be operated in a derated condition (lower power, speed, etc).

If the unit that fails relates to recording data, the recording function can be disabled upon an authentication failure. If the navigation system fails authentication, the corresponding features involving the navigation system can be limited such as reliance upon the GPS coordinates or location mapping.

In other aspects, frames received from slaves that are not authenticated may be ignored until another slave confirms the information contained in the data field.

If at S800, communication is not established with the ESS ("NO" at S800), the SCU 200 may check for timeout at S810 (time-bound limitation). This time may be different than the time set for receipt of an HMAC after sending the random number. In an aspect of the disclosure, if the SCU 200 determines a timeout, the SCU 200 may assert a failure mode at S885.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

What is claimed is:

1. An apparatus comprising:
   a storage storing a key associated with a vehicle device;
   a processor configured to:
   generate a random number;
   send the random number to the vehicle device via a vehicle communication network;
   receive an actual hash message authentication code (HMAC) from the vehicle device via the vehicle communication network, where the vehicle device determines the actual HMAC using a HMAC algorithm on an input and the key stored in a storage of the vehicle device, the input being determined by the vehicle device using a hash function on the random number;
   determine an expected hash message authentication code (HMAC) for the vehicle device using the HMAC algorithm on an input and the key stored in the storage, the input being determined by the apparatus using the hash function on the random number;
   compare the actual HMAC with the expected HMAC;
   determine that the vehicle device fails authentication when the actual HMAC does not match the expected HMAC; and
   cause at least one vehicle operation to be inhibited when the vehicle device fails authentication for a preset number of times while the vehicle device is connected to the vehicle communication network, wherein causing at least one vehicle operation to inhibited comprises controlling certain vehicle operations upon authentication based on input received from interfaces.

2. The apparatus according to claim 1, wherein the processor is further configured to:
   set a timer when the random number is sent to the vehicle device, the timer being set to a time where the apparatus must receive the actual HMAC.

3. The apparatus according to claim 2, wherein the processor is further configured to determine that the vehicle device fails authentication when the actual HMAC is not received within the time set on the timer.

4. The apparatus according to claim 1, wherein the vehicle device is an energy storage system, the energy storage system comprising energy cells, a processor and contactors, wherein when the vehicle device fails authentication for the preset number of times, the processor is configured to transmit a command to the processor in the energy storage system to maintain the contactors open isolating the energy cells from a DC voltage bus.

5. The apparatus according to claim 1, wherein the storage stores a plurality of keys associated with a plurality of vehicle devices, respectively, and wherein the processor is configured to authenticate each of the plurality of vehicle devices.

6. The apparatus according to claim 5, wherein the plurality of vehicle devices includes a propulsion control system and an accessory power supply.

7. The apparatus according to claim 1, wherein the processor is configured to authenticate the vehicle device when the actual HMAC matches the expected HMAC and control vehicle operations based on signals received from interfaces.

8. The apparatus according to claim 1, wherein the processor is further configured to count a number of times authentication has failed and compare the counted number of times with the preset number of times, and when the counted number of times is less the preset number of times, the processor is configured to generate a new random number and send the new random number to the vehicle device via the vehicle communication network, the expected HMAC is determined using the new random number and the key stored in the storage.

9. A method for authenticating onboard processors over a vehicle communication network, comprising:
generating a random number from a master;
sending the random number from the master unit to at least one vehicle device;
receiving an actual hash message authentication code (HMAC) from the at least one vehicle device via the vehicle communication network, where each of the at least one vehicle device determines the actual HMAC using a HMAC algorithm on an input and a key stored in the respective vehicle device, the input being determined by each of the at least one vehicle device using a hash function on the random number;
processing at the master an expected hash message authentication code (HMAC) for each of the at least one vehicle device using the HMAC algorithm on an input and a stored key associated with each of the at least one vehicle device, respectively, the input being determined for each of the at least one vehicle device using the hash function on the random number, respectively, where a different key is stored in association with each of the at least one vehicle device;
comparing the actual HMAC to the expected HMAC in the master for each of the at least one vehicle device;
authenticating the at least one vehicle device if the actual HMAC matches the expected HMAC, and failing authentication if the actual HMAC does not match the expected HMAC;
controlling certain vehicle operations upon authentication based on input received from interfaces; and
causing at least one vehicle operation to be inhibited upon failing authentication for a preset number of times while the vehicle device is connected to the vehicle communication network.

10. The method of claim 9, wherein the preset number of times is 1.

11. The method of claim 9, wherein the master is a system control unit of a hybrid electric vehicle or an electric vehicle.

12. The method of claim 9, wherein the at least one vehicle operation is an operation associated with a vehicle device that failed authentication for the preset number of times.

13. The method of claim 9, wherein a different random number is generated and sent to different vehicle devices when there are more than one vehicle device.

14. The method of claim 9, wherein the hash function is SHA3-256.

15. The method of claim 14, wherein the actual HMAC is truncated or padded to a 64 bit size.

16. The method of claim 9, wherein the random number is generated by a pseudorandom number generator (PRNG) or a cryptographically secure random number generator (CSRNG).

17. The method of claim 9, further comprising setting at least one timer when the random number is sent to each of the at least one vehicle device, respectively, the at least one timer being set to a time where the master must receive the actual HMAC from each respective at least one vehicle device.

18. The method of claim 17, wherein the time is different for different vehicle devices.

19. The method of claim 17, wherein the master determines that authentication fails for a vehicle device when the time expires without the receipt of the actual HMAC from the vehicle device.

20. The method of claim 9 further comprising:
counting a number of times authentication has failed for each of the at least one vehicle device; and
comparing the counted number of times with the preset number of times,
when the counted number of times is less the preset number of times, authentication process is repeated with a new random number.

21. The method of claim 9, wherein the at least one vehicle operation comprises high voltage, high current, high power, navigation, range and duration.

22. A computer program product including one or more non-transitory machine-readable media having instructions encoded thereon that, when executed by a processor, cause the processor to authenticate onboard processors over a vehicle communication network, comprising:
generating a random number from a master;
sending the random number from the master to at least one vehicle device;
receiving an actual hash message authentication code (HMAC) from the at least one vehicle device via the vehicle communication network, where each of the at least one vehicle device determines the actual HMAC using a HMAC algorithm on an input and a key stored in the respective vehicle device, the input being determined by each of the at least one vehicle device using a hash function on the random number;
processing at the master an expected hash message authentication code (HMAC) for each of the at least one vehicle device using the HMAC algorithm on an input and a stored key associated with each of the at least one vehicle device, respectively, the input being determined for each of the at least one vehicle device using the hash function on the random number, respectively, where a different key is stored in association with each of the at least one vehicle device;
comparing the actual HMAC to the expected HMAC in the master for each of the at least one vehicle device;

authenticating the at least one vehicle device if the actual HMAC matches the expected HMAC, and failing authentication if the actual HMAC does not match the expected HMAC;

controlling certain vehicle operations upon authentication based on input received from interfaces; and causing at least one vehicle operation to be inhibited upon failing authentication for a preset number of times while the vehicle device is connected to the vehicle communication network.

* * * * *